(12) United States Patent
Yamaguchi (10) Patent No.: US 7,778,771 B2
(45) Date of Patent: Aug. 17, 2010

(54) TRAVEL CONTROL SYSTEM FOR TRAVEL VEHICLE AND TRAVEL VEHICLE

(75) Inventor: Kazuyuki Yamaguchi, Kariya (JP)

(73) Assignee: Kabushiki Kaisha Toyota Jidoshokki, Aichi-Ken (JP)

( * ) Notice: Subject to any disclaimer, the term of this patent is extended or adjusted under 35 U.S.C. 154(b) by 714 days.

(21) Appl. No.: 11/728,745

(22) Filed: Mar. 26, 2007

(65) Prior Publication Data

US 2007/0225901 A1 Sep. 27, 2007

(30) Foreign Application Priority Data

Mar. 27, 2006 (JP) .............................. P2006-085520

(51) Int. Cl.
*G01C 21/00* (2006.01)
(52) U.S. Cl. ....................................... 701/201; 701/200
(58) Field of Classification Search ............. 701/23–25, 701/200–202, 208, 117–119; 340/988–989, 340/991–993
See application file for complete search history.

(56) References Cited

U.S. PATENT DOCUMENTS 5,615,116 A * 3/1997 Gudat et al. .................. 701/23

6,246,932 B1 * 6/2001 Kageyama et al. ............ 701/24

FOREIGN PATENT DOCUMENTS

JP 10-143242 5/1998

* cited by examiner

*Primary Examiner*—Yonel Beaulieu
(74) *Attorney, Agent, or Firm*—Locke Lord Bissell & Liddell LLP

(57) ABSTRACT

A travel control system for controlling a travel vehicle to advance from a first travel course toward a predetermined one of a plurality of second travel courses includes a destination information provider providing to the travel vehicle destination information indicating the predetermined one of the plurality of second travel courses before the travel vehicle reaches the junction and a first junction information provider providing to the travel vehicle junction information indicating one of the plurality of second travel courses before the travel vehicle reaches the junction. The travel vehicle obtains the destination information from the destination information provider and the junction information from the first junction information provider before reaching a junction between the first and second travel courses. The travel vehicle collates the destination information with the junction information and advances to the predetermined one of the plurality of second travel courses based on a result of the collation.

17 Claims, 9 Drawing Sheets

*1 DESTINATION INFORMATION
*2 JUNCTION INFORMATION

*1 DESTINATION INFORMATION
*2 JUNCTION INFORMATION

FIG. 7

*1 DESTINATION INFORMATION
*2 JUNCTION INFORMATION

FIG. 8

*1 DESTINATION INFORMATION
*2 JUNCTION INFORMATION

FIG. 9

TRAVEL CONTROL SYSTEM FOR TRAVEL VEHICLE AND TRAVEL VEHICLE

BACKGROUND OF THE INVENTION

The present invention relates to a travel control system for a travel vehicle which is suitable for automatically carrying assembly parts in a factory and to the travel vehicle.

Conventionally, a travel vehicle reads out travel route information from a memory which is provided for assembly parts to be carried and travels according to the travel route information (cf. Japanese Patent Application Publication No. 10-143242). According to this technique, in a travel course network having a junction between a first travel course and a plurality of second travel courses, the travel vehicle can advance from the first travel course to a predetermined one of the plurality of second travel courses. However, the above technique requires creating new travel route each time the layout of the travel course network is changed.

The present invention, which is made in view of the above problem, is directed to a travel control system for a travel vehicle which achieves easy advance of the travel vehicle from a first travel course to a predetermined one of a plurality of second travel courses in a travel course network having a junction between the first travel course and the plurality of second travel courses and to the travel vehicle.

SUMMARY OF THE INVENTION

A first aspect of the present invention provides a travel control system for controlling a travel vehicle to advance from a first travel course toward a predetermined one of a plurality of second travel courses in a travel course network having a junction between the first travel course and the plurality of second travel courses. The travel control system includes a destination information provider that provides to the travel vehicle destination information indicating the predetermined one of the plurality of second travel courses before the travel vehicle reaches the junction, and a first junction information provider that provides to the travel vehicle junction information indicating one of the plurality of second travel courses before the travel vehicle reaches the junction. The travel vehicle obtains the destination information from the destination information provider and the junction information from the first junction information provider before reaching the junction. The travel vehicle collates the destination information with the junction information. The travel vehicle advances to the predetermined one of the plurality of second travel courses based on a result of the collation.

A second aspect of the present invention provides a travel vehicle that advances from a first travel course to a predetermined one of a plurality of second travel courses in a travel course network having a junction between the first travel course and the plurality of second travel courses. The travel vehicle includes a destination information obtainer that obtains destination information indicating the predetermined one of the plurality of second travel courses before the travel vehicle reaches the junction, a junction information obtainer that obtains junction information indicating one of the plurality of second travel courses before the travel vehicle reaches the junction, and an advance controller that collates the destination information obtained by the destination information obtainer with the junction information obtained by the junction information obtainer before the travel vehicle reaches the junction. The advance controller controls the travel vehicle's advancement from the first travel course to the predetermined one of the plurality of second travel courses based on a result of the collation.

A third aspect of the present invention provides a method for controlling an advancement of a travel vehicle from a first travel course to a predetermined one of a plurality of second travel courses in a travel course network having a junction between the first travel course and the plurality of second travel courses. The method comprises the steps of: providing a destination information provider for providing to the travel vehicle destination information indicating the predetermined one of the plurality of second travel courses; providing a first junction information provider for providing to the travel vehicle junction information indicating one of the plurality of second travel courses; obtaining the destination information from the destination information provider before the travel vehicle reaches the junction; obtaining the junction information from the first junction information provider before the travel vehicle reaches the junction; collating the destination information obtained from the destination information provider with the junction information obtained from the first junction information provider before the travel vehicle reaches the junction; and controlling the travel vehicle to advance from the first travel course to the predetermined one of the plurality of second travel courses based on a result of the collation.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

The following will describe in detail a travel control system for a travel vehicle and the travel vehicle according to a preferred embodiment of the present invention with reference to FIGS. 1 through 5B.

Figure 1:
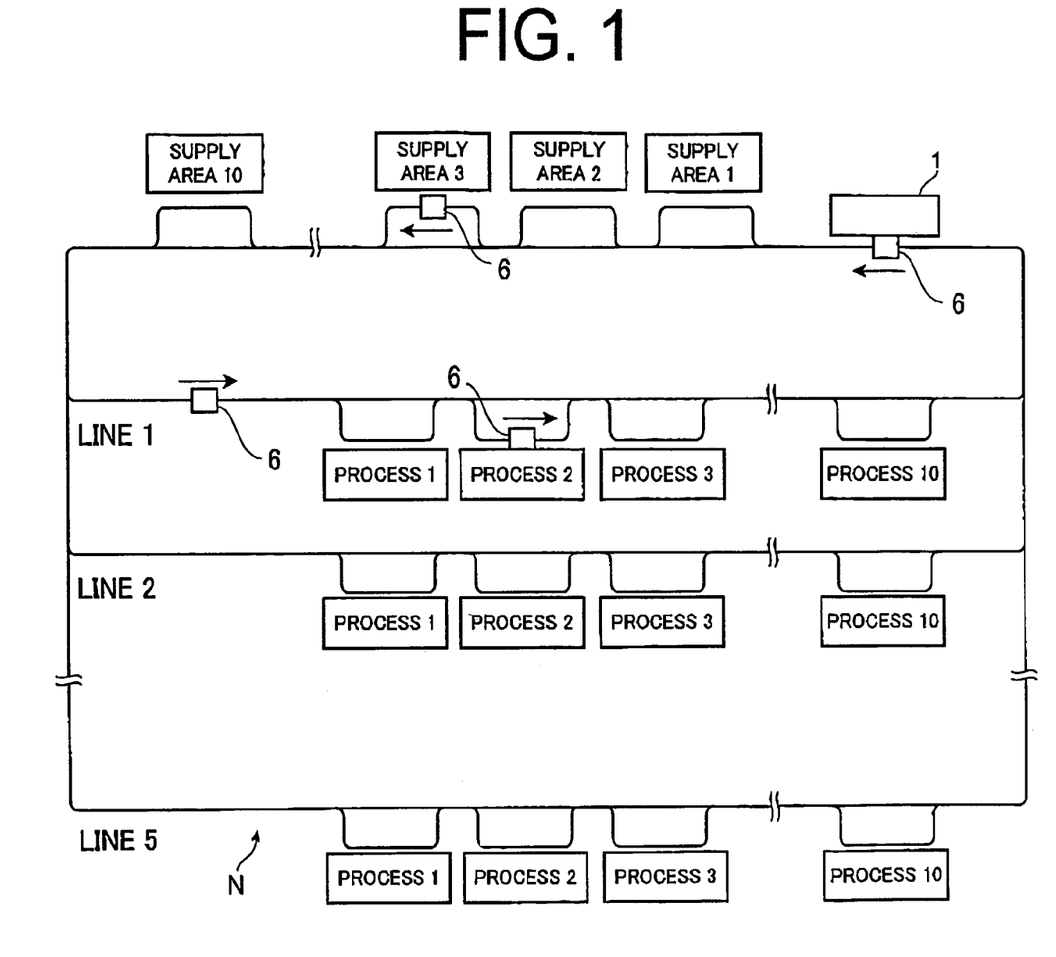
FIG. 1 is a view of a layout of a factory in which a travel control system for a travel vehicle and the travel vehicle of a preferred embodiment according to the present invention are used.

FIG. 1 is a view of the layout of a factory in which the travel control system for the travel vehicle and the travel vehicle of the preferred embodiment are used. For example, various models of forklift trucks are manufactured in the factory. Referring to FIG. 1, a travel course network N is formed by magnetic tape on the floor surface of the factory for an automated guided vehicle (or a travel vehicle) 6 to travel automatically. The travel course network N comprises supply areas 1 through 10 where assembly parts are supplied to the automated guided vehicle 6, lines 1 through 5 in which different models of forklift trucks (or products) are manufactured depending on assembly parts, and process 1 through 10 to which assembly parts are provided from the automated guided vehicle 6 in each of the lines 1 through 5 and in which the assembly parts are assembled. It is noted that the number of the lines, the number of the processes and the number of the supply areas are not limited to the above numbers.

An issuing machine (or a destination information provider) 1 is provided in the travel course network N upstream of the supply areas, 1 through 10 for issuing a destination information card to the automated guided vehicle 6. The destination information card is a recording medium which records data according to models of forklift trucks, and includes destination information indicating to which of the supply areas 1 through 10, the lines 1 through 5 and the processes 1, through 10 the automated guided vehicle 6 is to travel. An IC chip, a bar-cord, a printing using leuco dye or the like is used for recording the above data in the destination information card.

One example of travel of the automated guided vehicle 6 in the travel course network N will now be described. The destination Information card is issued by the issuing machine 1 and set at a predetermined place of the automated guided vehicle 6. The automated guided vehicle 6 reads out the data which are recorded in the destination information card. When information indicating the supply area 3, the line 1 and the process 2 are recorded as destination information in the destination information card, the automated guided vehicle 6 advances to the supply area 3 and is supplied with assembly parts at the supply area 3. The automated guided vehicle 6 carrying the assembly parts then advances to the line 3 and provides the assembly parts to the process 2. Then, the automated guided vehicle 6 returns to the issuing machine 1.

Figure 2:
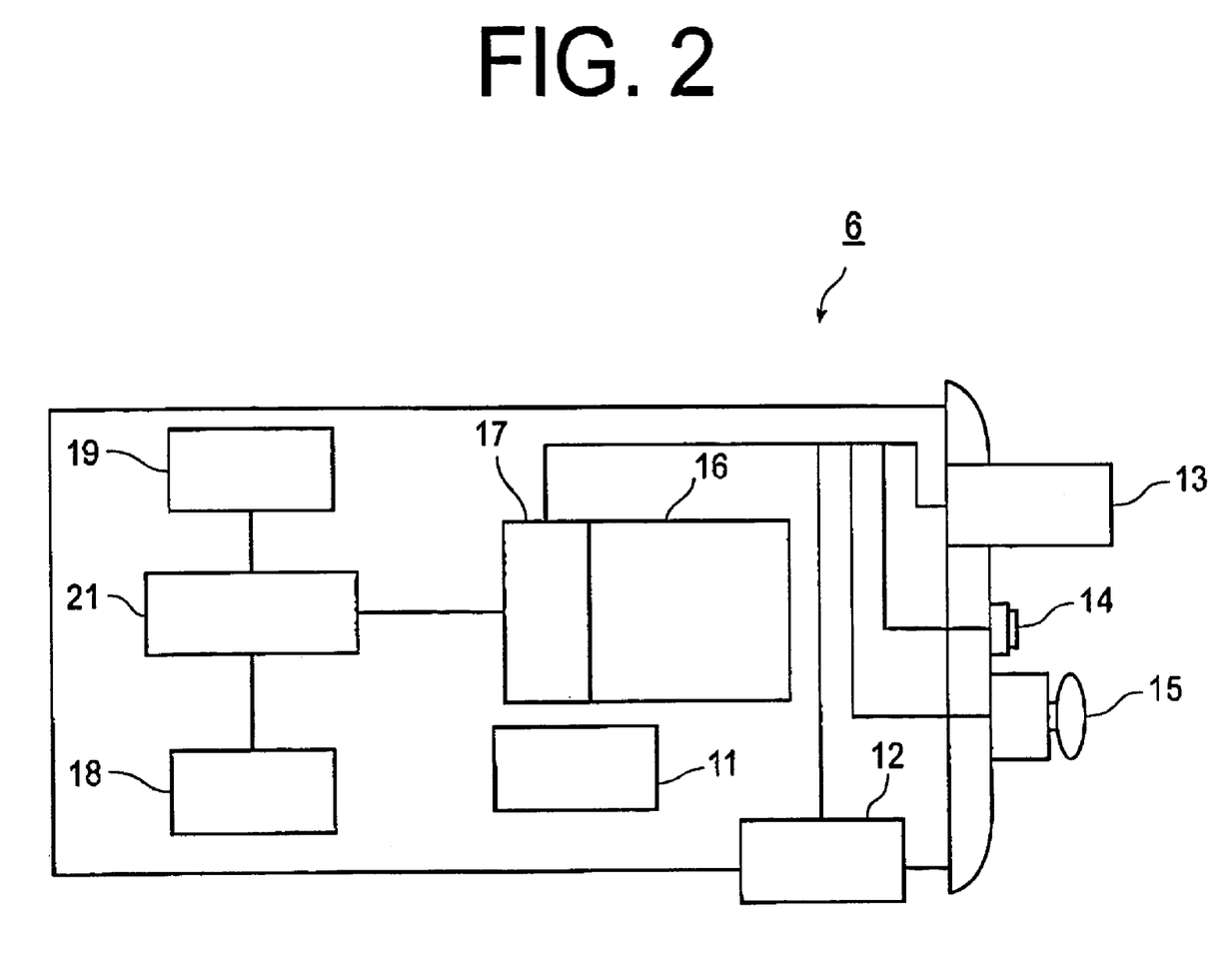
FIG. 2 is a schematic view of an automated guided vehicle as the travel vehicle of the preferred embodiment.

The construction of the automated guided vehicle 6 as the travel vehicle of the preferred embodiment will be described now with reference to FIG. 2. Referring to FIG. 2, the automated guided vehicle 6 includes a battery 11 for supplying electric power for automatic travel of the automated guided vehicle, a road surface sensor 12 for detecting the magnetic tape which forms the travel course network N, an obstacle sensor 13 for detecting obstacles which exist in the traveling direction of the automated guided vehicle 6, a start-up switch 14, a stop switch 15, a travel controller 16 for switching a priority edge of the magnetic tape and an input/output device 17 connecting the road surface sensor 12, the obstacle sensor 13 and the like to the travel controller 16.

The automated guided vehicle 6 travels while detecting a right edge or a left edge of the magnetic tape along the traveling direction thereof by the road surface sensor 12. When the road surface sensor 12 detects the left edge of the magnetic tape, the left edge corresponds to the priority edge. When the road surface sensor 12 detects the right edge of the magnetic tape, the right edge corresponds to the priority edge. The travel controller 16 switches the priority edge, which is detected by the road surface sensor 12, from the left edge to the right edge or vice versa.

The automated guided vehicle 6 also includes an IC reader (or a destination information obtainer) 18 for reading out the data which are recorded in the destination information card, an ID reader (or a junction information obtainer) 19 for reading out ID data of ID tags which are provided on the floor surface of the factory, and an advance controller 21 for performing a predetermined process based on the data of the destination information card obtained by the IC reader 18 and the ID data obtained by the ID reader 19 and sending out a predetermined signal to the travel controller 16 through the input/output device 17.

Figure 3:
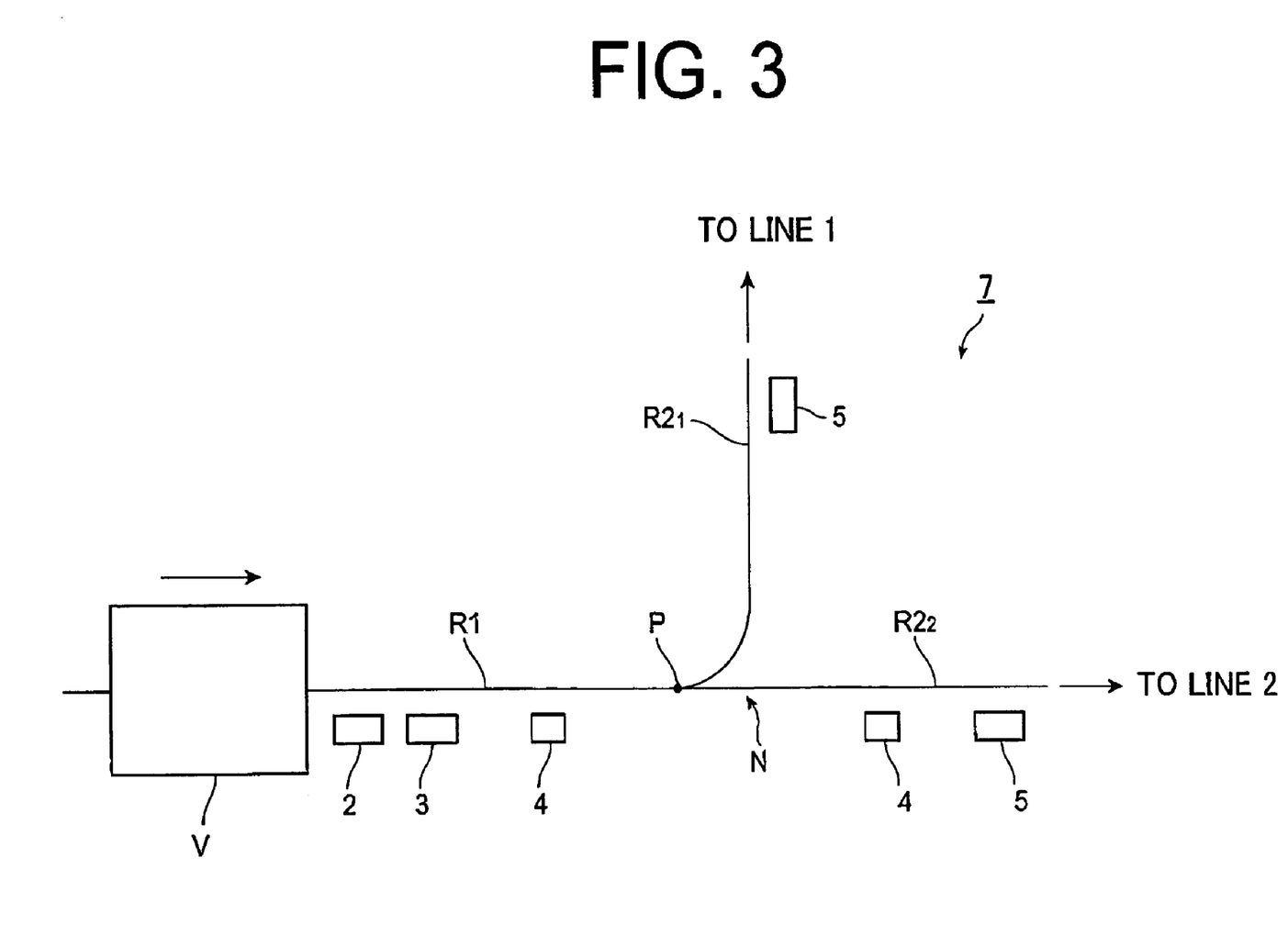
FIG. 3 is a schematic view of the travel control system for the automated guided vehicle as the travel vehicle of the preferred embodiment.

The following will describe a travel control system 7 for the automated guided vehicle 6 with reference to FIG. 3. FIG. 3 shows an area of the travel course network N adjacent to a junction P between a travel course (or a first travel course) R1 leading from the supply area 10 toward the line 1, a travel course (or a second travel course) $R2_1$ leading from the travel course R1 to the line 1 and a travel course (or a second travel course) $R2_2$ leading from the travel course R1 to the line 2. Namely, the travel course network N has the junction P where the travel course R1 branches into the travel courses $R2_1$ and $R2_2$.

As shown in FIG. 3, in addition to the above-described issuing machine 1, the travel control system 7 includes a low-speed switching command 2 and a priority edge command 3 both of which are formed by magnetic tape on the floor surface of the factory and an ID tag (or a first junction information provider) 4 which records therein ID data. The low-speed switching command 2, the priority edge command 3 and the ID tag 4 are arranged along the travel course R1 in this order from the upstream side. The travel control system 7 also includes a high-speed switching command 5 which is formed by magnetic tape on the floor surface of the factory and arranged in the travel course $R2_1$. Further, the travel control system 7 includes another ID tag (or a second junction information provider) 4 and another high-speed switching command 5 which are arranged along the travel course $R2_2$ in this order from the upstream side. It is noted that the order of arrangement of the low-speed switching command 2, the priority edge command 3 and the ID tag 4 along the travel course R1 and the order of arrangement of the ID tag 4 and the high-speed switching command 5 along the travel course $R2_2$ are not limited to the above arrangement orders.

The following will describe the operation of the automated guided vehicle 6 by the travel control system 7 with reference to FIGS. 3 through 5B.

Figure 4:
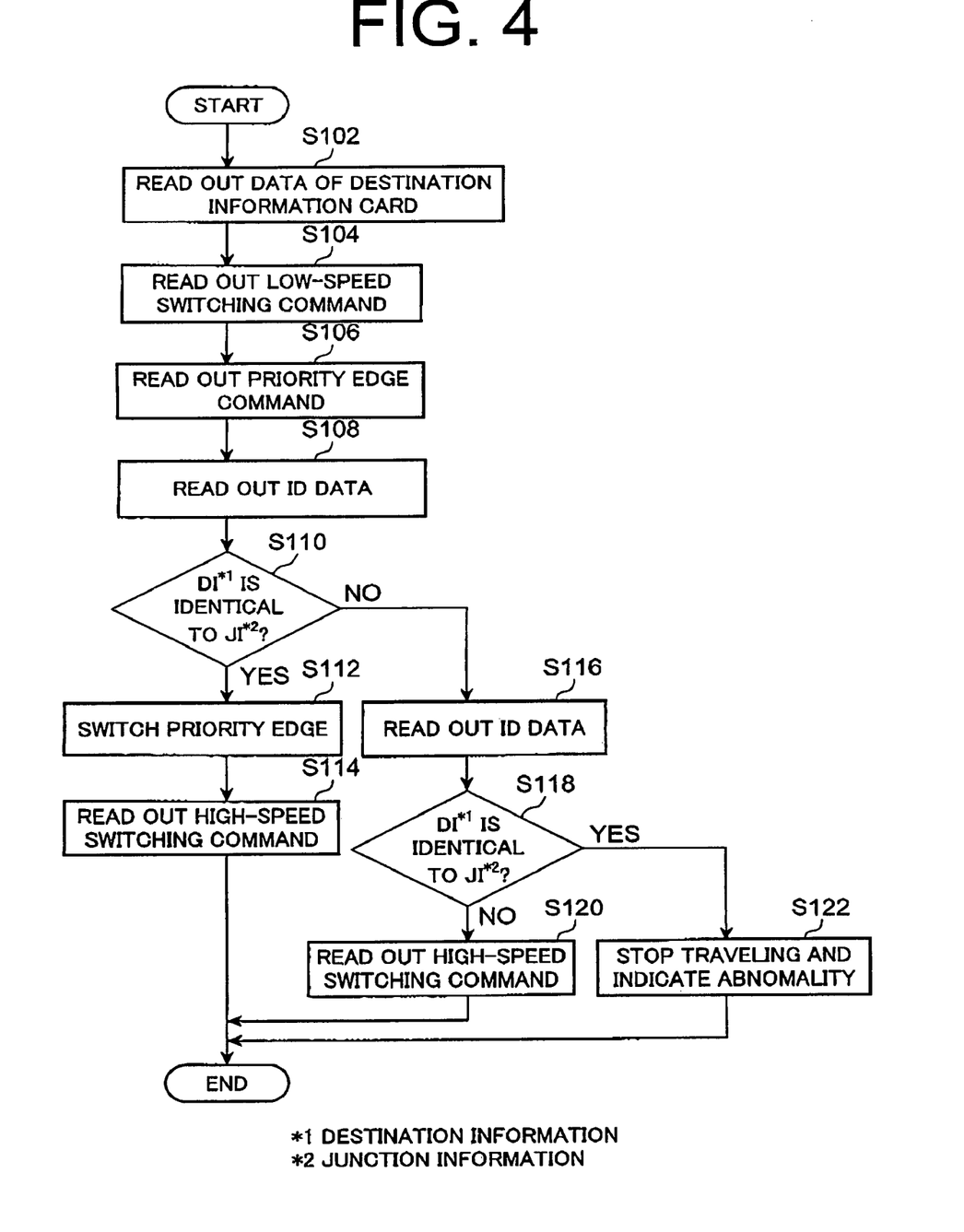
FIG. 4 is a flow chart showing the operation of the automated guided vehicle by the travel control system.

Referring to FIGS. 3 and 4, the IC reader 18 in the automated guided vehicle 6 receives the destination information card which is issued by the issuing machine 1 and reads out and stores therein the data which is recorded in the destination information card at a step S102. Traveling on the travel course R1 toward the junction P, the automated guided vehicle 6 reads out the low-speed switching command 2 by the road surface sensor 12 to lower the traveling speed thereof at a step S104. Then, the automated guided vehicle 6 reads out the priority edge command 3 by the road surface sensor 12 to switch the priority edge, which is detected by the road surface sensor 12, to the right edge of the magnetic tape at a step S106. The ID reader 19 in the automated guided vehicle 6 reads out and stores therein the ID data which is recorded in the ID tag 4 at a step S108.

Figure 5A:
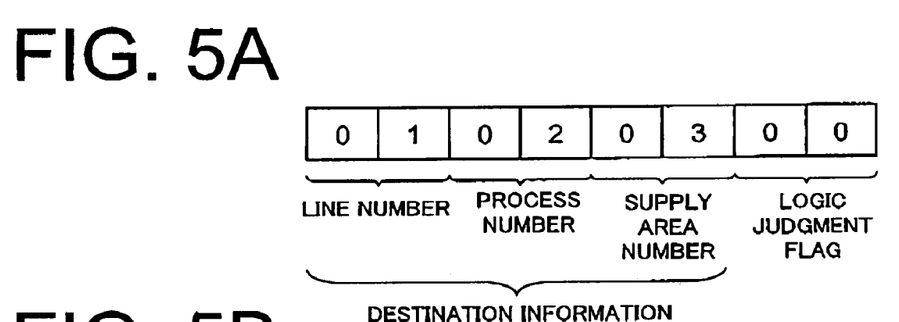
FIG. 5A is a view showing specifications of data of a destination information card.
Figure 5B:
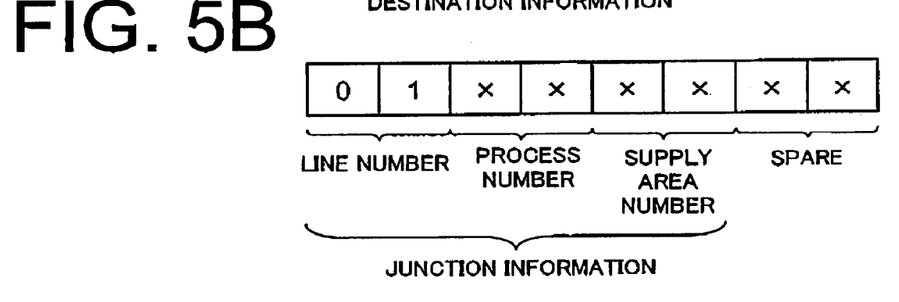
FIG. 5B is a view showing specifications of ID data.

Referring to FIG. 5A, the data of the destination information card includes a line number, a process number and a supply area number to which the automated guided vehicle 6 is to travel and a logic judgment flag. Referring to FIG. 5B, the ID data includes junction information indicating one or more of the line numbers (the lines 1 through 5), and a process number and a supply area number as the junction information are masked in junction area where the lines 1 through 5 are branched in the travel course network N. In junction area where the process 1 through 10 are branched in the travel course network N, the ID data includes junction information indicating one or more of the process numbers (the processes 1 through 10) and the line number and the supply area number as the junction information are masked. Similarly, in junction area where the supply areas 1 through 10 are branched in the travel course network N, the ID data includes junction information indicating one or more of the supply area numbers (the supply area Nos. 1 through 10) and the line number and the process number as the junction information are masked.

Following the step S108, the automated guided vehicle 6 collates the destination information in the stored data from the destination information card with the junction information in the stored ID data to judge whether the line number of the destination Information is identical to the line number of the junction information by the advance controller 21 at a step S110.

When the line number of the destination information is identical to the line number of the junction information as the result of the collation at the step S110, a priority edge switching signal is sent from the advance control 21 through the input/output device 17 to the travel controller 16, and the automated guided vehicle 6 switches the priority edge, which is detected by the road surface sensor 12, from the light edge to the left edge of the magnetic tape by the travel controller 16 at a step S112. Thus, the automated guided vehicle 6 advances from the travel course R1 through the junction P to the travel course R2$_1$, and the road surface sensor 12 reads out the high-speed switching command 5 in the travel course R2$_1$ to increase the traveling speed thereof at a step S114.

On the other hand, when the line number of the destination information is not identical to the line number of the junction information as the result of the collation at the step S110, the automated guided vehicle 6 keeps the priority edge, which is detected by the road surface sensor 12, to be the right edge of the magnetic tape and advances from the travel course R1 through the junction P to the travel course R2$_2$. The ID reader 19 in the automated guided vehicle 6 reads out and stores therein the ID data recorded in the ID tag 4 in the travel course R2$_2$ at a step S116. The automated guided vehicle 6 collates the destination information in the stored data from the destination information card with the junction information in the store ID data to judge whether the line number of the destination information is identical to the line number of the junction information by the advance controller 21 at a step S118.

When the line number of the destination information is not identical to the line number of the junction information as the result of the collation at the step 8118, the travel course to which the automated guided vehicle 6 advances is considered correct. Thus, the automated guided vehicle 6 keeps on traveling and the road surface sensor 12 reads out the high-speed switching command 5 to increase the traveling speed thereof at a step S120. On the other hand, when the line number of the destination information is identical to the line number of the junction information as the result of the collation at the step S118, the travel course to which the automated guided vehicle 6 advances is considered incorrect Thus, the automated guided vehicle 6 stops traveling and indicates an abnormality by a visual means or an auditory means at a step S122.

It is noted that the above-mentioned logic judgment flag in the destination information card is information for changing a process in which the priority edge is switched when the line number of the destination information is identical to the line number of the junction information in the above collation at the step S110 and in which it is not switched when not, to a process in which the priority edge is not switched when the line number of the destination information is identical to the line number of the junction information in the above collation at the step S110 and in which it is switched when not. The above-described steps S116 through S122 or error-checking processes are not indispensable to the travel control system 7 and the automated guided vehicle 6.

As described above, in the travel control system 7 for the automated guided vehicle 6, the automated guided vehicle 6 traveling on the travel course R1 toward the junction P obtains the destination information indicating the line number, the process number and the supply area number from the issuing machine 1 through the destination information card before reaching the junction P. In the junction area of the lines 1 through 5, the automated guided vehicle 6 obtains the junction information indicating any one of the line numbers (the lines 1 through 5) from the ID tag 4 which is provided in the travel course R1 upstream of the junction P. The automated guided vehicle 6 collates the line number of the destination information with the line number of the junction information and advances from the travel course R1 to the travel course R2$_1$ or R2$_2$ based on the result of the collation. Using the destination information and the Junction information facilitates the advancement of the automated guided vehicle 6 from the travel course R1 to the travel course R2$_1$ or R2$_2$. This renders control system, travel route information and the like unnecessary and makes the travel control system respond flexibly to modification of the layout of the travel course network N. The same is true for the junction area of the process 1 through 10 and the junction area of the supply area 1 through 10.

The present invention is not limited to the preferred embodiment described above but may be modified into alternative embodiments as exemplified below.

The automated guided vehicle is used as a travel vehicle of the present invention in the above-described preferred embodiment. However, the travel vehicle of the present invention may be a manned travel vehicle or a travel vehicle which does not carry assembly parts. For example, the travel vehicle of the present invention may be a manned vehicle, an unmanned vehicle, a wired vehicle, a wireless vehicle, a forklift truck, an electric vehicle a hand truck, a tow car or the like.

Figure 6:
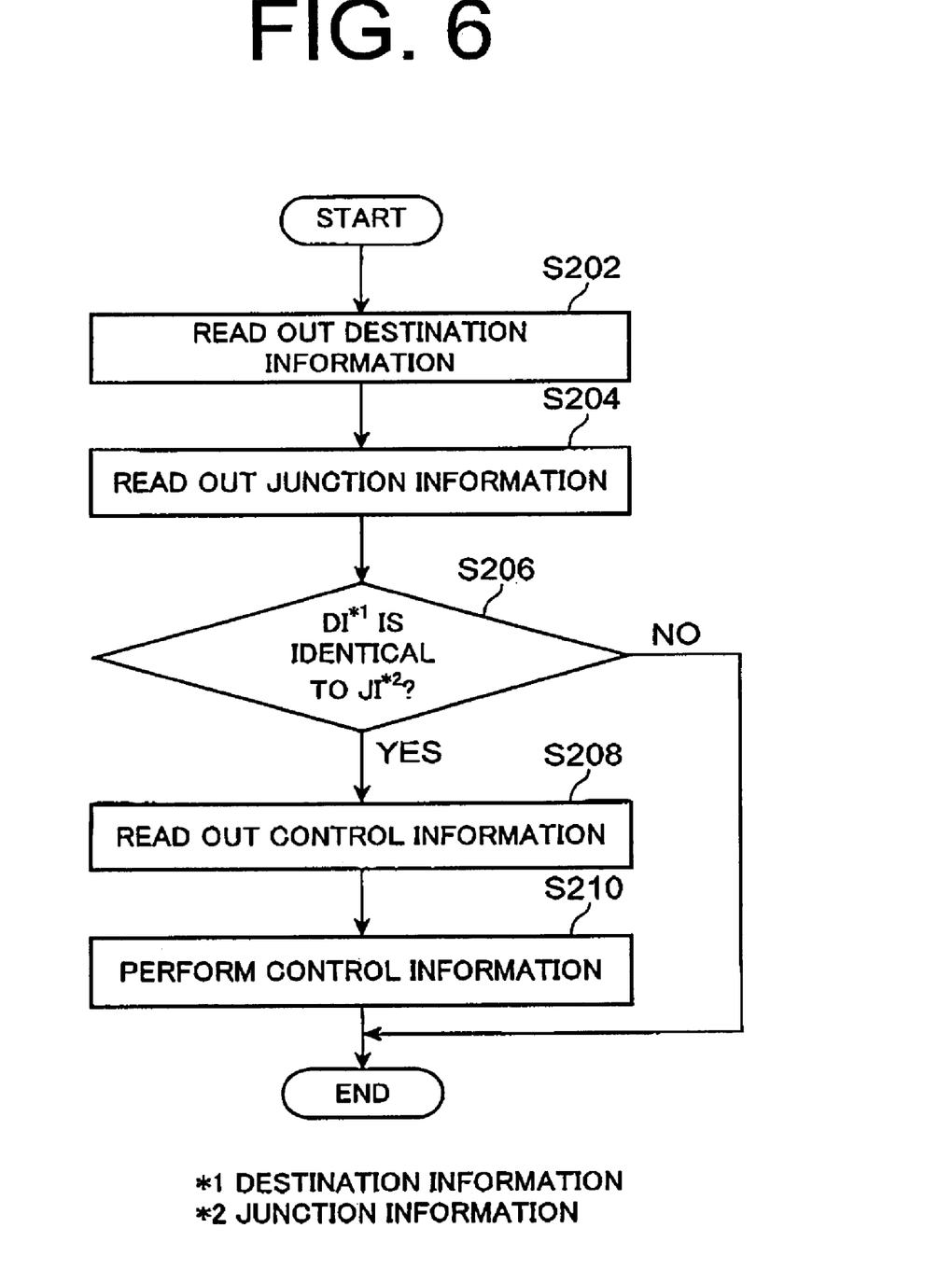
FIG. 6 is a flow chart showing the operation of the automated guided vehicle by the travel control system according to an alternate embodiment.
Figure 7:
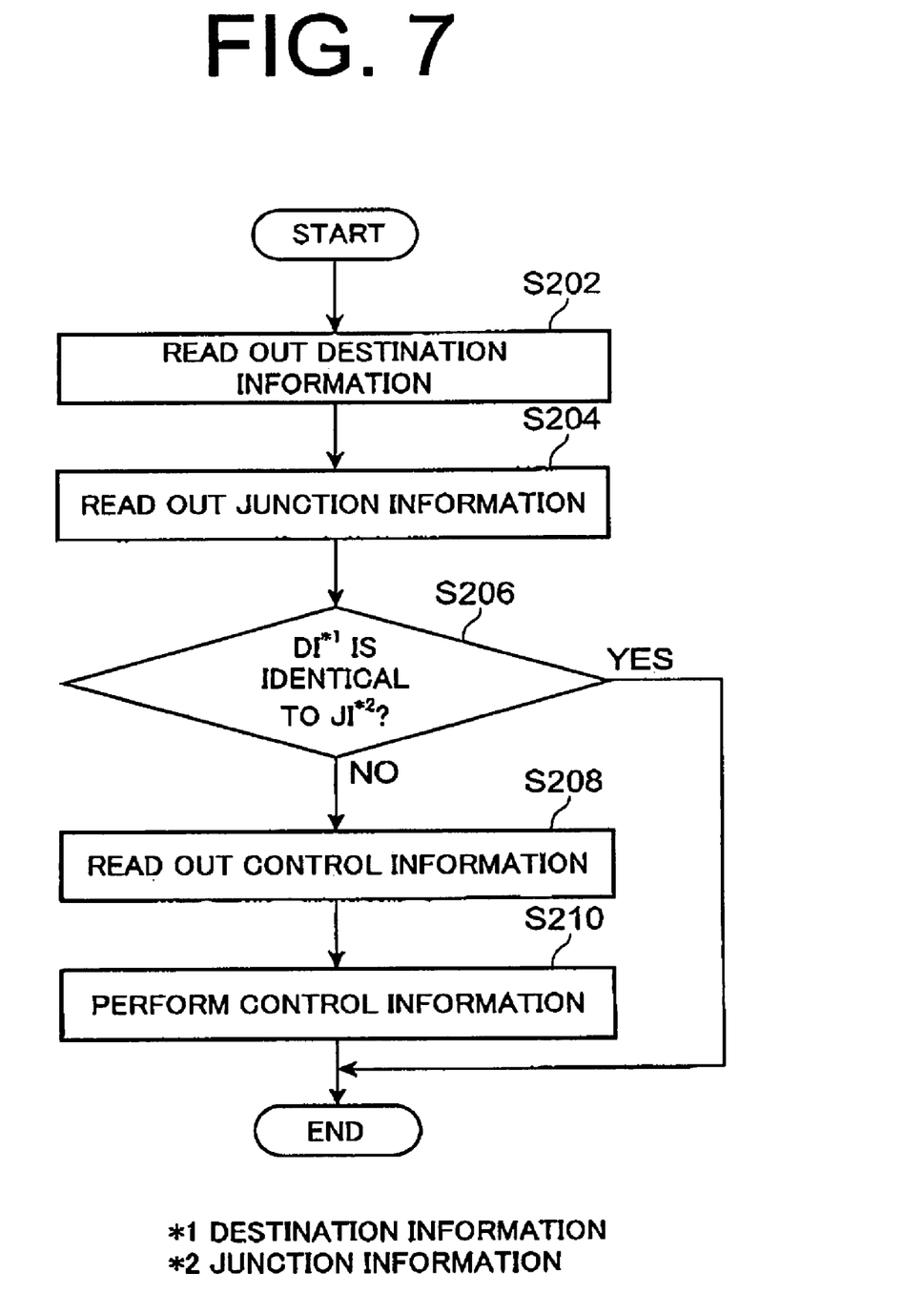
FIG. 7 is a flow chart showing the operation of the automated guided vehicle by the travel control system according to an alternate embodiment.

Alternatively, the operation of the automated guided vehicle 6 by the travel control system 7 may be as follows. In an alternative embodiment as shown in FIG. 6, the automated guided vehicle 6 reads out the destination information at a step S202 and the junction information at a step S204. Then, the automated guided vehicle 6 collates the destination information with the junction information at a step S206. When the destination information is identical to the junction information as the result of the collation, the automated guided vehicle 6 reads out control information at a step S208 and performs the control information at a step S210. It is noted that the order of the steps S202 and S204 may be changed. In another alternative embodiment as shown in FIG. 7, when the destination information is not identical to the junction information as the result of the collation (the step S206), the automated guided vehicle 6 reads out the control information (the step S208) and perform the control information (the step S210).

Figure 8:
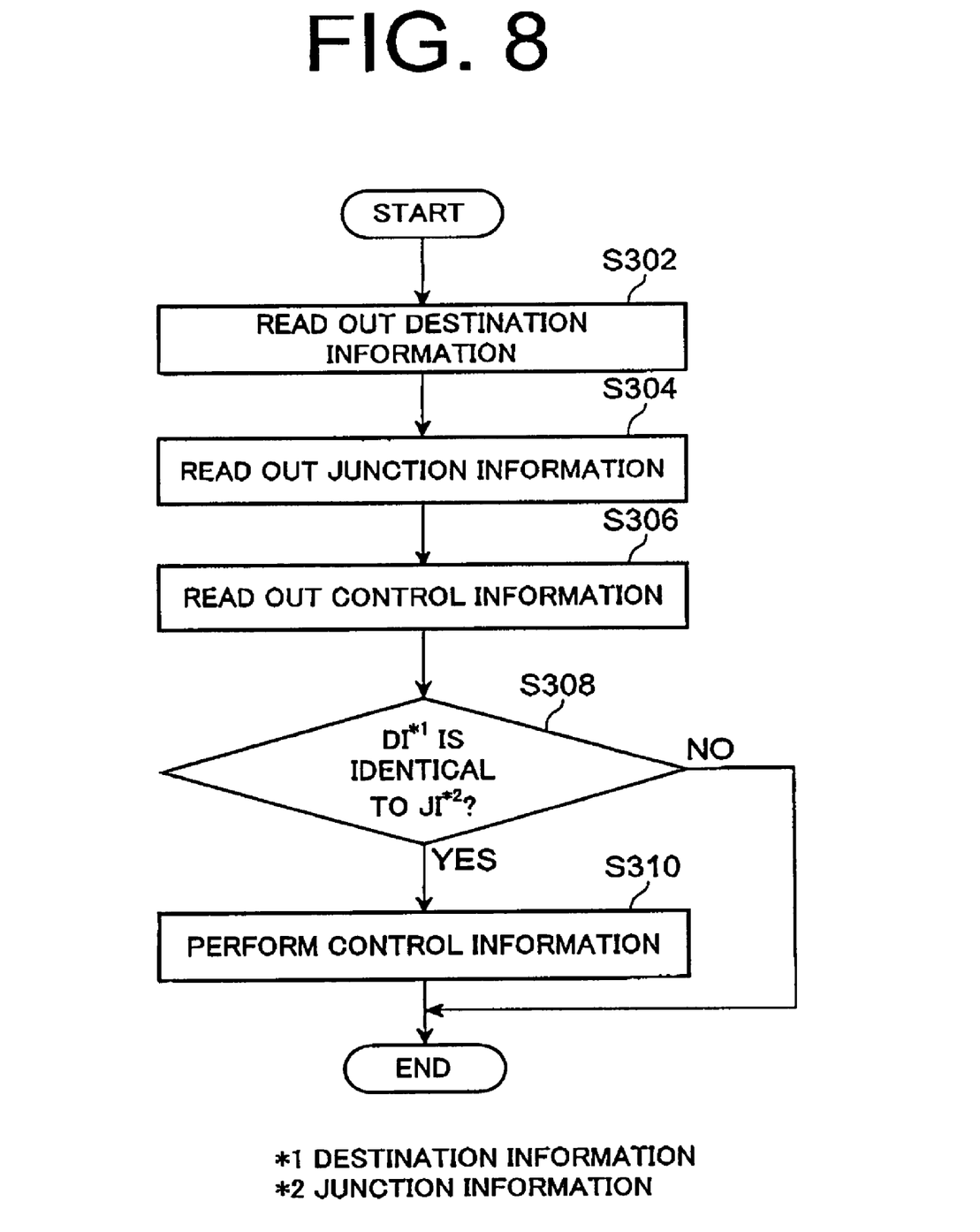
FIG. 8 is a flow chart showing the operation of the automated guided vehicle by the travel control system according to an alternate embodiment.
Figure 9:
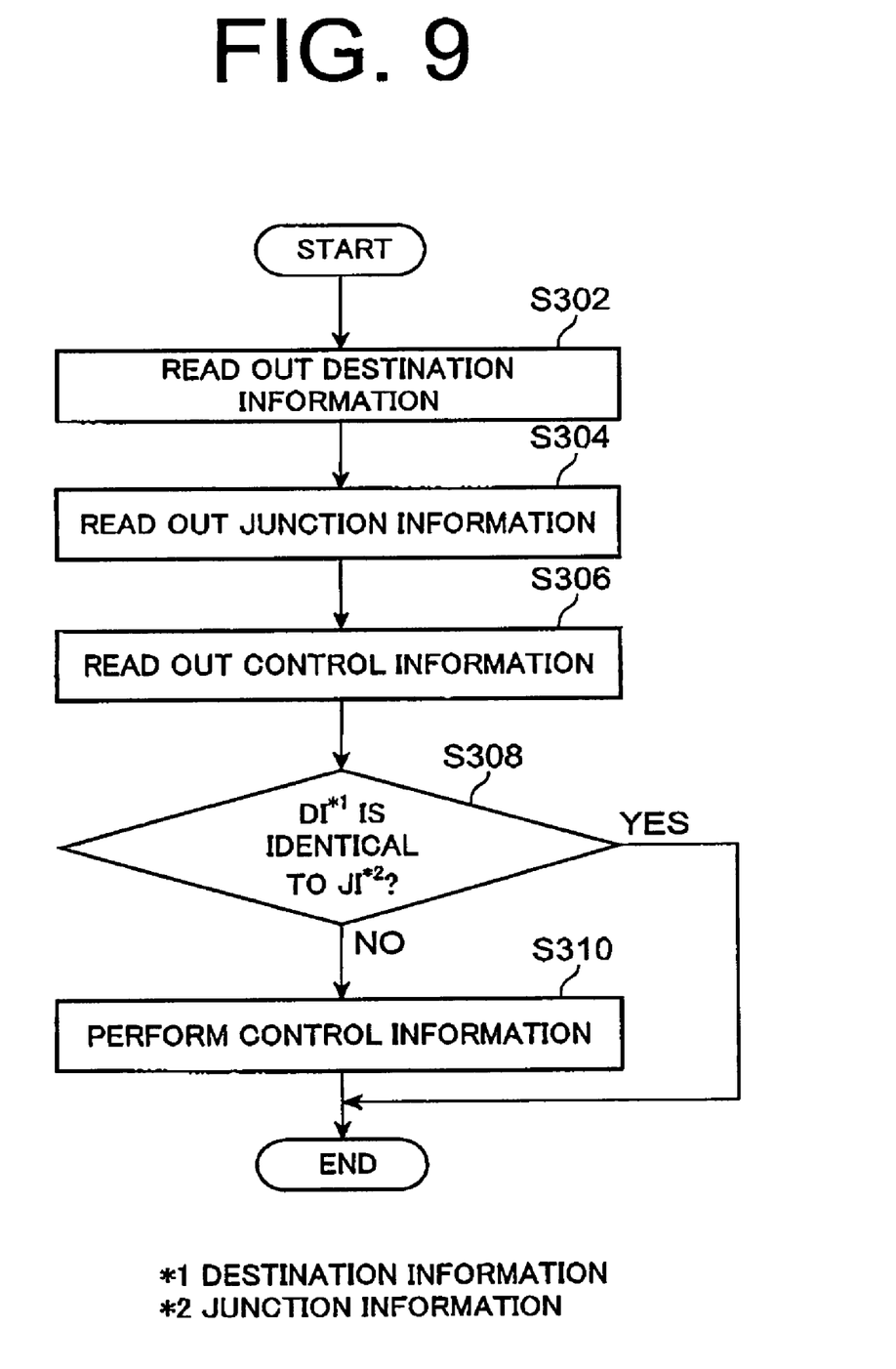
FIG. 9 is a flow chart showing the operation of the automated guided vehicle by the travel control system according to an alternate embodiment.

Alternatively, the operation of the automated guided vehicle 6 by the travel control system 7 may be as follows. In an alternative embodiment as shown in FIG. 8, the automated guided vehicle 6 reads out the destination information at a step S302, the junction information at a step S304 and the control information at a step S306. Then, the automated guided vehicle 6 collates the destination information with the junction information at a step S308. When the destination information is identical to the junction information as the result of the above collation, the automated guided vehicle 6 performs the control information at a step S310. It is noted that the order of the steps S302 through S306 may be changed. In another alternative embodiment as shown in FIG. 9, when the destination information is not identical to the junction information as the result of the collation (the step S308), the automated guided vehicle 6 performs the control information (the step S310).

The destination information and the junction information described above may be, for example, information indicating factory, model and part of product or the like in addition to the supply area, the line and the process. The control information described above may be, for example, information indicating a change of right-and-left direction, a change of direction at multiple branch junction or the like.

Therefore, the present examples and embodiments are to be considered as illustrative and not restrictive, and the invention is not to be limited to the details given herein but may be modified within the scope of the appended claims.

What is claimed is:

1. A travel control system for controlling a travel vehicle to advance from a first travel course toward a predetermined one of a plurality of second travel courses in a travel course network having a junction between the first travel course and the plurality of second travel courses, the travel control system comprising:
    a destination information provider that provides to the travel vehicle destination information indicating the predetermined one of the plurality of second travel courses before the travel vehicle reaches the junction, wherein the destination information provider is provided in the travel course network leading towards the first travel course; and
    a first junction information provider that provides to the travel vehicle junction information indicating one of the plurality of second travel courses before the travel vehicle reaches the junction, wherein the first junction information provider is provided in the first travel course upstream of the junction and downstream of the destination information provider,
    wherein the travel vehicle obtains the destination information from the destination information provider and the junction information from the first junction information provider before reaching the junction, the travel vehicle collating the destination information with the junction information, the travel vehicle advancing to the predetermined one of the plurality of second travel courses based on a result of the collation.

2. The travel control system according to claim 1, wherein the travel vehicle is an automated guided vehicle operable to travel automatically.

3. The travel control system according to claim 1, wherein the travel vehicle carries assembly parts, each of the destination information and the junction information includes at least one of a supply area where the assembly parts are supplied to the travel vehicle, a line in which the assembly parts are assembled for manufacturing a product, and a process to which the assembly parts are provided from the travel vehicle in the line.

4. The travel control system according to claim 1, wherein the destination information provider is an issuing machine which is provided in the travel course network for issuing a medium which records data including the destination information.

5. The travel control system according to claim 1, wherein the first junction information provider is an ID tag which is provided in the first travel course.

6. The travel control system according to claim 1, further comprising a second junction information provider for providing to the travel vehicle junction information indicating one of the plurality of second travel courses after the travel vehicle passes through the junction.

7. The travel control system according to claim 6, wherein the travel vehicle collates the destination information obtained from the destination information provider with the junction information obtained from the second junction information provider for judging whether or not the travel vehicle keeps on traveling.

8. The travel control system according to claim 6, wherein the second junction information provider is an ID tag which is provided in one of the plurality of second travel courses.

9. A travel vehicle for advancing from a first travel course to a predetermined one of a plurality of second travel courses in a travel course network having a junction between the first travel course and the plurality of second travel courses, the travel vehicle comprising:
    a destination information obtainer that obtains destination information indicating the predetermined one of the plurality of second travel courses from a destination information provider provided in the travel course network leading toward the first travel course before the travel vehicle reaches the junction;
    a junction information obtainer that obtains junction information indicating one of the plurality of second travel courses from a junction information provider provided in the first travel course upstream of the junction and downstream of the destination information provider before the travel vehicle reaches the junction; and
    an advance controller that collates the destination information obtained by the destination information obtainer with the junction information obtained by the junction information obtainer before the travel vehicle reaches the junction, the advance controller controlling the travel vehicle to advance from the first travel course to the predetermined one of the plurality of second travel courses based on a result of the collation.

10. The travel vehicle according to claim 9, wherein the travel vehicle is an automated guided vehicle operable to travel automatically.

11. The travel vehicle according to claim 9, wherein the destination information obtainer is an IC reader.

12. The travel vehicle according to claim 9, wherein the junction information obtainer is an ID reader.

13. A method for controlling an advancement of a travel vehicle from a first travel course to a predetermined one of a plurality of second travel courses in a travel course network having a junction between the first travel course and the plurality of second travel courses, the method comprising the steps of:

providing a destination information provider in the first travel course network leading toward the first travel course for providing to the travel vehicle destination information indicating the predetermined one of the plurality of second travel courses;

providing a first junction information provider in the first travel course upstream of the injunction and downstream of the destination information provider for providing to the travel vehicle junction information indicating one of the plurality of second travel courses;

obtaining the destination information from the destination information provider before the travel vehicle reaches the junction;

obtaining the junction information from the first junction information provider before the travel vehicle reaches the junction;

collating the destination information obtained from the destination information provider with the junction information obtained from the first junction information provider before the travel vehicle reaches the junction; and controlling the travel vehicle to advance from the first travel course to the predetermined one of the plurality of second travel courses based on a result of the collation.

14. The method according to claim 13, wherein the destination information provider is an issuing machine which is provided in the travel course network for issuing a medium which records data including the destination information.

15. The method according to claim 13, wherein the first junction information provider is an ID tag which is provided in the first travel course.

16. The method according to claim 13, further comprising the steps of:

providing a second junction information provider in one of the plurality of second travel courses for providing to the travel vehicle junction information indicating one of the plurality of second travel courses:

obtaining the junction information from the second junction information provider after the travel vehicle passes through the junction; and collating the destination information obtained from the destination information provider with the junction information obtained from the second junction information provider for judging whether or not the travel vehicle keeps on traveling.

17. The method according to claim 16, wherein the second junction information provider is an ID tag.

* * * * *